US012634917B2

(12) United States Patent (10) Patent No.: US 12,634,917 B2
Zhao (45) Date of Patent: May 19, 2026

(54) METHOD FOR DETERMINING TRANSMISSION RESOURCES AND TERMINAL DEVICE

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 481 days.

(21) Appl. No.: 17/983,978

(22) Filed: Nov. 9, 2022

(65) Prior Publication Data

US 2023/0069646 A1      Mar. 2, 2023

Related U.S. Application Data

(63) Continuation of application No. PCT/CN2020/089947, filed on May 13, 2020.

(51) Int. Cl.
*H04W 72/1263* (2023.01)
*H04W 72/12* (2023.01)
(Continued)

(52) U.S. Cl.
CPC ....... *H04W 72/12* (2013.01); *H04W 72/1263* (2013.01); *H04W 72/23* (2023.01); *H04W 72/20* (2023.01)

(58) Field of Classification Search
CPC . H04W 72/12; H04W 72/1263; H04W 72/23;

H04W 72/20; H04W 84/005; H04W 92/18; H04W 72/0446; H04W 4/40; H04W 4/70; H04W 72/115; H04W 4/46; H04W 72/232; H04W 72/25; H04L 5/0094

See application file for complete search history.

(56) References Cited

U.S. PATENT DOCUMENTS

2016/0219620 A1 *  7/2016  Lee ........................ H04W 72/04
2020/0045674 A1 *  2/2020  Tseng .................... H04W 76/14
(Continued)

FOREIGN PATENT DOCUMENTS

CN        109479292 A       3/2019
CN        109803397 A       5/2019
(Continued)

OTHER PUBLICATIONS

First Office Action issued in corresponding Japanese application No. 2022-568986, mailed Jan. 26, 2024.
(Continued)

*Primary Examiner* — Edan Orgad
*Assistant Examiner* — Malick A Sohrab
(74) *Attorney, Agent, or Firm* — BAYES PLLC

(57) ABSTRACT

The present application relates to a method for determining transmission resources and a terminal device. The method includes: determining, by a terminal device, a time domain position of a time unit; and determining, by the terminal device, a time domain position of a sidelink configured grant transmission resource according to the determined time domain position of the time unit and a first resource pool. The first resource pool is a resource pool associated with the sidelink configured grant.

16 Claims, 9 Drawing Sheets

<u>200</u>

Determine, by a terminal device, a time domain position of a first time unit — S210

Determine, by the terminal device, a time domain position of a sidelink configured grant transmission resource according to the first time unit and a first resource pool — S220

(51) Int. Cl.
 *H04W 72/23* (2023.01)
 *H04W 72/20* (2023.01)

(56) References Cited

U.S. PATENT DOCUMENTS

| | | | | |
|---|---|---|---|---|
| 2020/0275474 | A1* | 8/2020 | Chen | H04L 1/1607 |
| 2020/0404671 | A1* | 12/2020 | Karaki | H04W 72/53 |
| 2021/0144582 | A1* | 5/2021 | Yi | H04W 28/0278 |
| 2023/0055280 | A1* | 2/2023 | Hwang | H04L 1/1812 |

FOREIGN PATENT DOCUMENTS

| | | |
|---|---|---|
| CN | 110447293 A | 11/2019 |
| CN | 110731117 A | 1/2020 |
| EP | 3402269 A1 | 11/2018 |
| WO | 2019149182 A1 | 8/2019 |

OTHER PUBLICATIONS

Notice of Allowance issued in corresponding European application No. 20936025.4, mailed Jan. 26, 2024.

Source: ITL; Title: Mode-1 resource allocation for NR V2X 3GPP TSG RAN WG1 #100bis R1-2002184 e-Meeting, Apr. 20-30, 2020.

Title: Remaining issues of mode 1 operation on sidelink; Source: ZTE, Sanechips 3GPP TSG RAN WG1 #100bis-e R1-2001895 e-Meeting, Apr. 20-30, 2020.

Oppo, "Left issues on MAC running CR", R2-2002648, 3GPP TSG-RAN2 Meeting # 109bis electronic Apr. 20-Apr. 30, 2020.

Huawei et al., "Discussion on remaining MAC open issues for 5G V2X with NR SL", R2-2003555, 3GPP TSG-RAN WG2 Meeting #109-bis electronic Apr. 20-30, 2020.

International Search Report issued in International application No. PCT/CN2020/089947, mailed Jan. 27, 2021.

Written Opinion of the International Searching Authority issued in International application No. PCT/CN2020/089947, mailed Jan. 27, 2021.

Vivo, "Remaining issues on mode 1 resource allocation mechanism", R1-2001660, 3GPP TSG RAN WG1 #100bis e-Meeting, Apr. 20-30, 2020.

Notice of Allowance issued in corresponding Japanese application No. 2022-568986, mailed Jun. 11, 2024.

Priority Review issued in corresponding Chinese application No. 202310204692.0, mailed Jul. 31, 2024.

First Office Action issued in corresponding Chinese application No. 202310204692.0, mailed Aug. 23, 2024.

Extended European Search Report issued in corresponding European application No. 20936025.4, mailed Apr. 25, 2023.

Oppo, "Remaining issues of mode 1 resource allocation for NR-V2X", R1-2001746, 3GPP TSG RAN WG1 #100bis e-Meeting, Apr. 20-30, 2020.

First Office Action issued in corresponding India Application No. 202217070632, mailed on Apr. 2, 2025, 7 pages.

Notice of Submission of Opinion issued in corresponding Korean Application No. 10-2022-7043579, mailed on Jul. 4, 2025, 10 pages.

Notice of Final Rejection issued in corresponding Korean Application No. 10-2022-7043579, dated Mar. 13, 2026, 7 pages.

* cited by examiner

<u>100</u> base station sidelink communication sidelink communication

UE1 UE2

Data

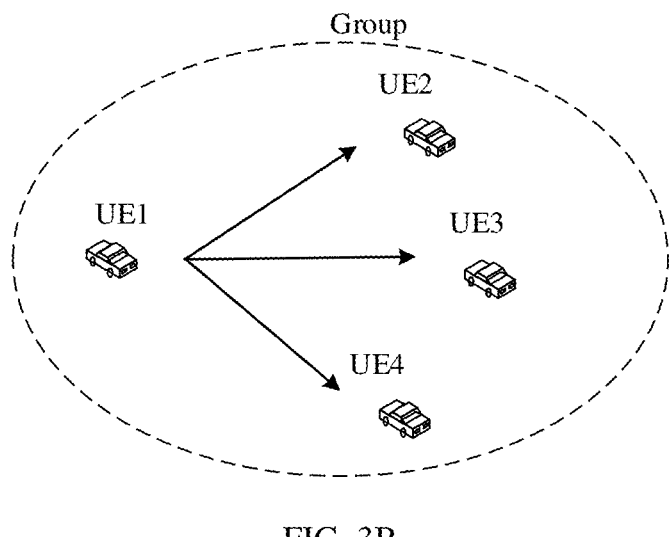
FIG. 3B
FIG. 3C
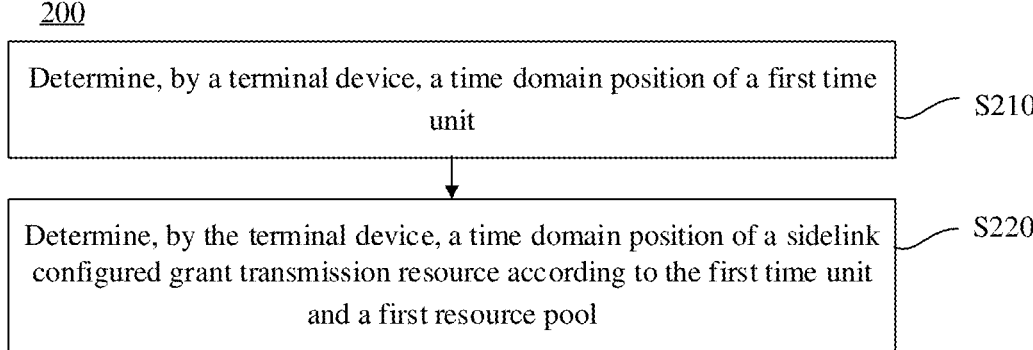
200
| Determine, by a terminal device, a time domain position of a first time unit | S210 |
↓
| Determine, by the terminal device, a time domain position of a sidelink configured grant transmission resource according to the first time unit and a first resource pool | S220 |
FIG. 4

METHOD FOR DETERMINING TRANSMISSION RESOURCES AND TERMINAL DEVICE

CROSS-REFERENCE TO RELATED APPLICATION

The present application is a continuation of International Application No. PCT/CN2020/089947 filed on May 13, 2020, which is incorporated herein by reference in its entirety.

TECHNICAL FIELD

Embodiments of the present disclosure generally relate to the communication technical field, and more particularly, to a transmission resource determination method and terminal device.

BACKGROUND

Device to Device (D2D) communication is a transmission technology based on Sidelink (SL). Different from the traditional cellular systems in which the communication data is received or sent via a base station, the D2D system has higher spectral efficiency and lower transmission delay. Vehicle to Everything (V2X) system adopts terminal-to-terminal direct communication. In a sidelink transmission system, a set of transmission resources may be called a resource pool. One or more resource pools may be config- ured through pre-configuration or network configuration. How to use the resource pool(s) to determine a sidelink configured grant transmission resource is a problem that needs to be solved.

SUMMARY

Embodiments of the present disclosure provide a trans- mission resource determination method and a terminal device, which can determine a sidelink configured grant transmission resource.

An embodiment of the present disclosure provides a transmission resource determination method, including:

determining, by a terminal device, a time domain position of a first time unit; and determining, by the terminal device, a time domain posi- tion of a sidelink configured grant transmission resource according to the first time unit and a first resource pool, wherein the first resource pool is a resource pool associated with the sidelink configured grant.

An embodiment of the present disclosure provides a terminal device including:

a first determination unit configured to determine a time domain position of a first time unit; and a second determination unit configured to determine a time domain position of a sidelink configured grant transmission resource according to the first time unit and a first resource pool, wherein the first resource pool is a resource pool associated with the sidelink config- ured grant.

An embodiment of the present disclosure provides a terminal device including a processor and a memory for storing a computer program, wherein the processor is con- figured to call and run the computer program stored in said memory to perform the above transmission resource deter- mination method.

An embodiment of the present disclosure provides a chip configured to perform the above transmission resource determination method.

Specifically, the chip includes a processor which is con- figured to call and run a computer program from a memory to cause a device in which the chip is installed to perform the above transmission resource determination method.

An embodiment of the present disclosure provides a computer-readable storage medium for storing a computer program which causes a computer to perform the above transmission resource determination method.

An embodiment of the present disclosure provides a computer program product including computer program instructions which cause a computer to perform the above transmission resource determination method.

An embodiment of the present disclosure provides a computer program which when running on a computer, causes the computer to perform the above transmission resource determination method.

In embodiments of the present disclosure, based on the first resource pool associated with the sidelink configured grant and the previously obtained time domain position of the first time unit, the time domain position of the sidelink configured grant transmission resource is determined.

BRIEF DESCRIPTION OF THE DRAWINGS

FIG. 3B is a schematic diagram of a grouopcast trans- mission.

FIG. 3C is a schematic diagram of a broadcast transmis- sion.

FIG. 4 is a schematic flowchart of a transmission resource determination method according to an embodiment of the present disclosure.

DETAILED DESCRIPTION

Figure 1:
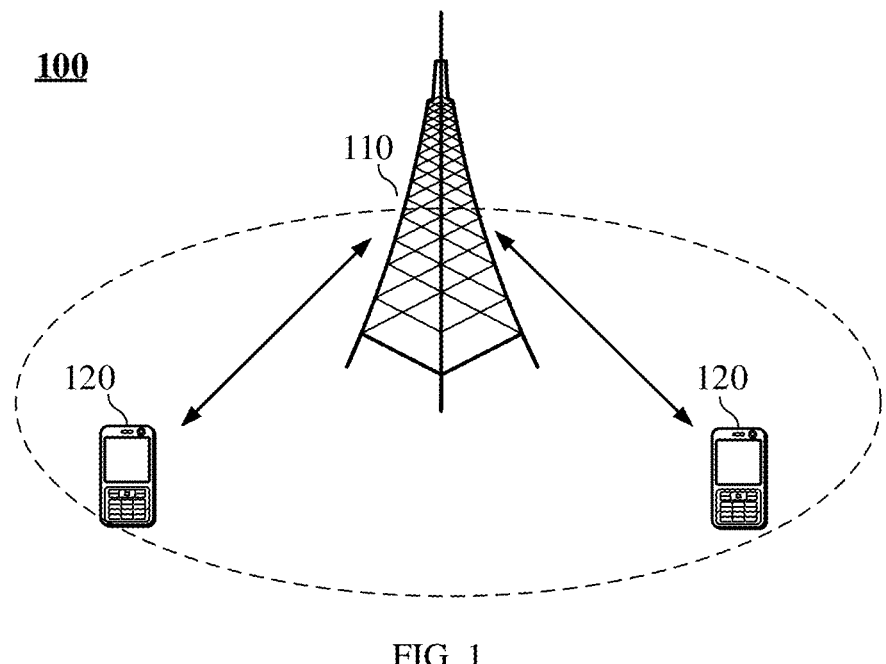
FIG. 1 is a schematic diagram of an application scenario according to an embodiment of the present disclosure.

The technical solutions in embodiments of the present disclosure will be described below with reference to the drawings in the embodiments of the present disclosure.

The technical solutions according to the embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication ($5^{th}$-Generation, 5G) system or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Embodiments of the present disclosure can be applied to these communications systems.

The communication systems in embodiments of the present disclosure can be applied to a Carrier Aggregation (CA) scenario, can also be applied to a Dual Connectivity (DC) scenario, and can also be applied to a standalone (SA) network deployment scenario.

The spectrum which embodiments of the present disclosure can be applied in is not limited. For example, embodiments of the present disclosure may be applied to licensed spectrum or unlicensed spectrum.

Embodiments of the present disclosure are described in combination with a network device and a terminal device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device (gNB) in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

FIG. 1 exemplarily shows a communication system 100. The communication system includes one network device 110 and two terminal devices 120. According to some embodiments, the communication system 100 may include multiple network devices 110 and the coverage of each network device 110 may include other numbers of terminal devices 120, and embodiments of the present disclosure do not impose specific limitations on this.

According to some embodiments, the communication system 100 may further include other network entities such as a Mobility Management Entity (MME), or an Access and Mobility Management Function (AMF), which are not limited in embodiments of the present disclosure.

It should be understood that the terms "system" and "network" are often used interchangeably herein. The term "and/or" herein is only an association relationship to describe associated objects, indicating that there can be three kinds of relationships, for example, A and/or B can mean three cases: A alone, B alone, and A and B together. In addition, the character "/" herein generally indicates that the related objects before and after the character are in an "or" relationship.

According to the network coverage of the communicating terminals, sidelink communications may be divided into: in coverage sidelink communication, partial coverage sidelink communication and out-of-coverage sidelink communication.

Figure 2A:
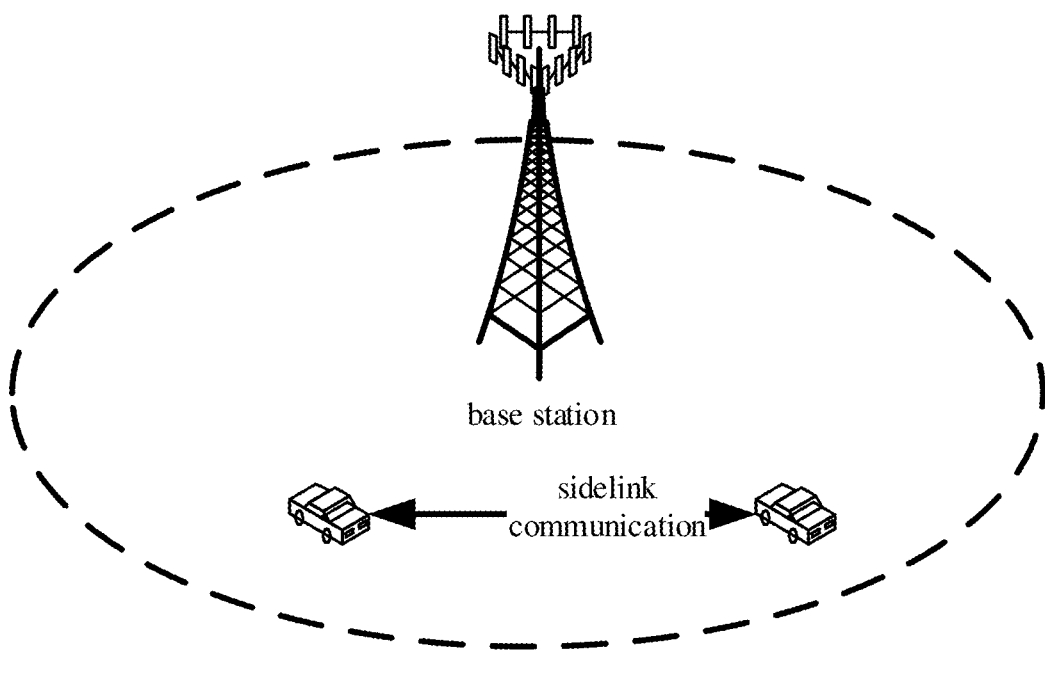
FIG. 2A is a schematic diagram of in coverage sidelink communication.

As shown in FIG. 2A, in the case of in coverage sidelink communication, all the terminals performing the sidelink communication are within the coverage of the same base station. Therefore, these terminals can all perform sidelink communication based on the same sidelink configuration by receiving configuration signaling from the base station.

Figure 2B:
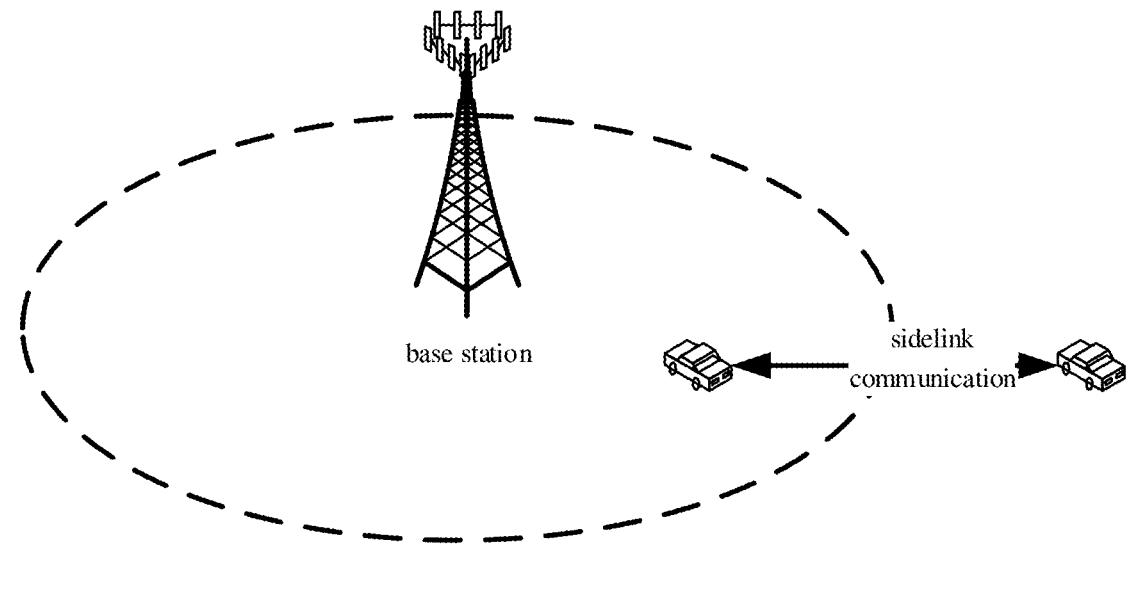
FIG. 2B is a schematic diagram of partial coverage sidelink communication.

As shown in FIG. 2B, in the case of partial coverage sidelink communication, a part of terminals performing sidelink communication are located within the coverage of the base station, and these terminals can receive configuration signaling from the base station, and perform sidelink communication according to the configuration of the base station. However, the terminals located outside the network coverage cannot receive the configuration signaling from the base station. In this case, the terminals outside the network coverage may determine sidelink configuration according to pre-configuration information and information carried in Physical Sidelink Broadcast Channel (PSBCH) sent by a terminal located within the network coverage.

Figure 2C:
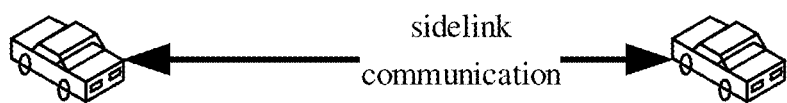
FIG. 2C is a schematic diagram of out-of-coverage side- link communication.

As shown in FIG. 2C, in the case of out-of-coverage sidelink communication, all the terminals performing the sidelink communication are located outside the network coverage, and all the terminals determine the sidelink configuration for the sidelink communication according to the pre-configuration information.

The Internet of Vehicles (IoV) system adopts device-to-device direct communication. In 3rd Generation Partnership Project (3GPP) protocols, IoV has two transmission modes: a first mode and a second mode.

In the first mode: transmission resources for terminals are allocated by the network, such as a base station gNB. The terminals transmit data on the sidelink according to the resources allocated by the base station. The base station may allocate resources for a single transmission to the terminals, or may allocate resources for semi-static transmission to the terminals. As shown in FIG. 2A, the terminals are located within the coverage of the network, and the network allocates transmission resources for sidelink transmission to the terminals.

In the second mode: a terminal selects a resource in a resource pool for data transmission. As shown in FIG. 2C, the terminals are located outside the coverage of a cell, and the terminals autonomously select transmission resources from a preconfigured resource pool to perform sidelink transmission. Alternatively, as shown in FIG. 2A, the terminals autonomously select transmission resources from a resource pool configured by the network to perform sidelink transmission.

In NR-V2X, autonomous driving can be supported, and accordingly higher requirements are placed on data interactions between vehicles, for example, higher throughput, lower latency, higher reliability, larger coverage, and more flexible resource allocation.

Figure 3A:
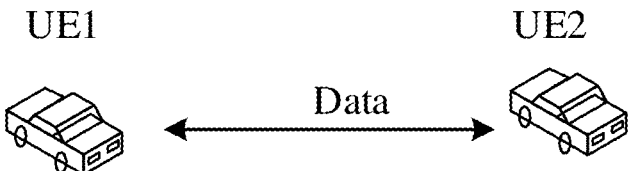
FIG. 3A is a schematic diagram of a unicast transmission.

In LTE-V2X, broadcast transmission mode is supported. In NR-V2X, unicast and multicast transmission modes are introduced. For the unicast transmission, there is only one terminal at the receiving end. As shown in FIG. 3A, unicast transmission is performed between UE1 and UE2. For the groupcast transmission, the receiving end includes all terminals in a communication group, or all terminals within a certain transmission distance. As shown in FIG. 3B, UE1, UE2, UE3 and UE4 form a communication group, where UE1 transmits data, and other terminals in the group are receiving terminals. For the broadcast transmission mode, the receiving end is any terminal around the transmitting terminal. As shown in FIG. 3C, UE1 is the transmitting terminal, and the other terminals around it, i.e., UE2 to UE6, are all receiving terminals.

FIG. 4 is a schematic flowchart of a transmission resource determination method 200 according to an embodiment of the present disclosure. The method may optionally be applied to the system shown in FIG. 1, but is not limited thereto. The method includes at least some of the following.

In S210, a terminal device determines a time domain position of a first time unit.

In S220, the terminal device determines a time domain position of a sidelink configured grant transmission resource according to the first time unit and a first resource pool. The first resource pool is a resource pool associated with the sidelink configured grant.

In a sidelink transmission system, the resource pool may be a set of transmission resources. The transmission resources configured by the network or the transmission resources autonomously selected by the terminals are resources in the resource pool. One or more resource pools may be configured through pre-configuration or network configuration. Resource pools may be divided into transmission resource pools and reception resource pools. The transmission resources in the transmission resource pools may be used for transmitting sidelink data; the transmission resources in the reception resource pools may be used for receiving sidelink data. For example, a terminal device has one or more resource pools available.

The following example illustrates how to determine a time domain resource in a resource pool. For example, the subcarrier spacing is 15 kHz, one subframe (or slot) corresponds to a time length of 1 millisecond, and one system frame (System Frame Number, SFN) or Direct Frame Number (DFN) period includes 10240 subframes. The remaining subframes are obtained after removing the synchronization subframe, the downlink subframe, the special subframe, and the reserved subframe in the SFN period. The remaining subframes are divisible by the length of a bitmap, and the bitmap is repeated periodically within the range of the remaining subframes. A subframe corresponding to a bit value of 1 in the bitmap belongs to the resource pool, and a subframe corresponding to a bit value of 0 does not belong to the resource pool.

When the network configures sidelink configured grant transmission resources for a terminals, it usually associates the sidelink configured grant with a resource pool, for example, the resource pool associated with the sidelink configured grant is the first resource pool. Using the first resource pool, a sidelink configured grant (SL CG) transmission resource for the terminal device may be determined.

It should be understood that the sidelink configured grant is associated with the first resource pool, which means that the sidelink configured grant transmission resource is a transmission resource in the first resource pool.

In the embodiment of the present disclosure, the time domain position of the sidelink configured grant transmission resource is determined based on the first resource pool associated with the sidelink configured grant and the previously obtained time domain position of the first time unit. In this way, it is possible to perform reasonable selection or adjustment on time units which do not belong to the resource pool associated with the sidelink configured grant, and thus the sidelink configured grant transmission resource for the terminal device can be more accurately determined.

Optionally, in some embodiments of the present disclosure, the time domain position includes an index of a time unit.

Optionally, in some embodiments of the present disclosure, the time unit is a slot, and the index of the slot is equal to an index of SFN multiplied by the number of slots in a radio frame, then plus a slot number of the slot in the radio frame. The index of the slot may be an index of the slot in the radio frame period. For example, for 15 kHz subcarrier spacing, a radio frame includes 10240 slots, and the index value range of the slot is [0, 10239]. The index of the slot may be determined by the index of the SFN (the value range is [0, 1023]), the number of slots in the radio frame, and the slot number in the radio frame. For example, the index of the SFN is 2, the number of slots in the radio frame is 10, the slot number in the radio frame is 2, and the index of the slot is 22.

Optionally, in some embodiments of the present disclosure, the time unit is a subframe, and the index of the subframe is equal to an index of SFN multiplied by the number of subframes in a radio frame, then plus a subframe number of the subframe in the radio frame. The index of the subframe may be an index of the subframe in the radio frame period. For example, for 15 kHz subcarrier spacing, a radio frame includes 10240 subframes, and the index value range of the subframe is [0, 10239]. The index of the subframe may be determined by the index of the SFN (the value range is [0, 1023]), the number of subframes in the radio frame, and the subframe number. For example, the index of the SFN is 1, the number of subframes in the radio frame is 10, the subframe number in the radio frame is 7, and the index of the slot is 17.

Optionally, in some embodiments of the present disclosure, the time domain position of the first time unit is determined by using a first formula.

Optionally, in some embodiments of the present disclosure, the first formula includes at least one of the following parameters: a time domain offset, a periodicity, a time domain resource indication, a first frame number index, a first time unit index and the number of time units in a radio frame.

Optionally, the following parameters may also be included in the first formula: the time unit number and System Frame Number (SFN) in the radio frame.

For example, the first formula is as follows:

$$
\begin{aligned}
&\text{number of time units in the radio frame} \times \text{SFN} + \text{the} \\
&\quad \text{time unit number in the radio frame} = [\text{time} \\
&\quad \text{domain offset} + \text{time domain resource indication} + \\
&\quad N \times \text{periodicity}] \text{modulo } (1024 \times \text{number of time} \\
&\quad \text{units in the radio frame}) \quad\quad (1)
\end{aligned}
$$

In the above formula (1), (number of time units in the radio frame×SFN+the time unit number in the radio frame) represents the index of the time unit or the time domain position of the time unit.

The meanings of the parameters in the above formula (1) are as follows:

The time domain offset may be used to determine the time domain position of the first SL CG transmission resource. Optionally, the time domain offset is the number of time units relative to SFN=0 (or DFN=0).

The periodicity is the periodicity of the SL CG transmission resource(s). Optionally, the periodicity parameter is represented by the number of slots, and further, the periodicity parameter is represented by the number of physical slots.

The time domain resource indication is determined according to time domain resource indication information. For example, Radio Resource Control (RRC) signaling or Downlink Control Information (DCI) signaling for the sidelink configured grant carries the time domain resource indication information. According to the time domain resource indication information, the time domain resource indication may be determined.

Optionally, the time domain resource indication determined according to the time domain resource indication information is a slot interval relative to the time domain position determined according to the time domain offset parameter. For example, for the type-1 sidelink configured grant, the time domain position determined according to the time domain offset parameter is T0, and the value determined according to the time domain resource indication information is T1 (that is, corresponding to the time domain resource indication in formula (1)), and this value is a slot interval relative to T0. Therefore, the time domain position determined according to the configuration parameter in one sidelink configured grant periodicity is T0+T1.

In some embodiments, the value of the time domain resource indication is 0.

In some embodiments, the value of the time domain resource indication includes one, two or three values.

N is a positive integer.

The SFN indicates the index of the SFN, and its value range may be [0, 1023].

The number of time units in the radio frame may be an integer multiple of 10. For example, for 15 kHz subcarrier spacing, the number of time units in a radio frame is 10, and the value range of the time unit number in the radio frame may be [0, 9].

The modulo refers to the modulo operation.

For another example, the first formula may be as follows:

$$
\begin{aligned}
&\text{number of time units in the radio frame} \times \text{SFN} + \text{the} \\
&\quad \text{time unit number in the radio frame} = [\text{a first} \\
&\quad \text{frame number index} \times \text{number of time units in} \\
&\quad \text{the radio frame} + \text{a first time unit index} + \text{time} \\
&\quad \text{domain resource indication} + N \times \text{periodicity}] \\
&\quad \text{modulo}(1024 \times \text{number of time units in the radio} \\
&\quad \text{frame}) \quad\quad (2)
\end{aligned}
$$

In the above formula (2), (number of time units in the radio frame×SFN+the time unit number in the radio frame) represents the index of the time unit or the time domain position of the time unit.

The meanings of the parameters in the above formula (2) are as follows:

The first frame number index and the first time unit index are determined according to the slot where the RRC signaling for configuring the sidelink configured grant or the DCI signaling for activating the sidelink configured grant is located. The frame number may be SFN or DFN. The time unit is a slot or a subframe. The value range of the first frame number index is [0, 1023]. The first time unit index is an index of a time unit in a radio frame, and the value range is [0, numberOfSlotsPerFrame−1], where numberOfSlotsPerFrame indicates the number of time units in the radio frame. For example, for 15 kHz subcarrier spacing, one radio frame includes 10 slots, and one radio frame period includes 10240 slots. If the DCI for activating the type-2 sidelink configured grant appears at the 35th slot in the radio frame period, then it may be determined according to the slot position of the DCI that the corresponding first frame number index is 3 and the first time unit index is 5.

The periodicity is the periodicity of the SL CG transmission resources. Optionally, the periodicity parameter is represented by the number of slots, and further, the periodicity parameter is represented by the number of physical slots.

The time domain resource indication is determined according to the time domain resource indication information. For example, the time domain resource indication information is carried in the DCI signaling for the sidelink configured grant. The time domain resource indication may be determined according to the time domain resource indication information.

Optionally, the time domain resource indication determined according to the time domain resource indication information is a slot interval relative to the time domain position where the DCI signaling for activating the sidelink configured grant is located. For example, for the type-2 sidelink configured grant, the time domain position of the DCI for activating the sidelink configured grant is T0, and the value determined according to the time domain resource indication information is T1 (that is, corresponding to the time domain resource indication in formula (2))), and the value is the slot interval relative to T0.

In some embodiments, the value of the time domain resource indication is 0.

In some embodiments, the value of the time domain resource indication includes one, two or three values.

N is a positive integer.

SFN indicates the index of the SFN, and its value range may be [0, 1023].

The number of time units in the radio frame may be an integer multiple of 10. For example, for 15 kHz subcarrier spacing, the number of time units in the radio frame is 10, and the value range of the time unit number in the radio frame may be [0, 9].

The modulo refers to the modulo operation.

Optionally, in some embodiments of the present disclosure, the method further includes: receiving, by the terminal device, configuration information from a network device, wherein the configuration information is used by the terminal device to determine at least one of the following parameters: a slot offset, a periodicity, and the time domain resource indication. Specifically, for the type-1 sidelink configured grant, after receiving the configuration information, the terminal device substitutes the slot offset, periodicity and time domain resource indication determined according to the configuration information into the above formula (1) to calculate the time domain position of the first time unit. For the type-2 sidelink configured grant, after receiving the configuration information, the terminal device determines the periodicity according to the configuration information. The terminal receives the DCI for activating the sidelink configured grant, and determines, according to the DCI, the frame number index (that is, the first frame number index) and the slot index (that is, the first time unit index) corresponding to the slot of the DCI, and determines the time domain resource indication according to the DCI. The terminal device substitutes the periodicity, the time domain resource indication, the first frame number index, and the first time unit index into the above formula (2) to calculate the time domain position of the first time unit. Then, the terminal device determines whether each calculated first time unit belongs to the first resource pool associated with the SL CG of the terminal device. If each first time unit belongs to the first resource pool, the time domain positions of these first time units are determined as the time domain positions of the SL CG transmission resources of the terminal device. If a part of the first time units does not belong to the first resource pool, the time domain position of the SL CG transmission resource of the terminal device can be finally obtained after some processing.

Optionally, in some embodiments of the present disclosure, determining the time domain position of the sidelink configured grant transmission resource according to the first time unit and the first resource pool includes: determining, by the terminal device, the time domain position of the first time unit which belongs to the first resource pool as the time domain position of the sidelink configured grant transmission resource. The terminal device determines a first time unit which does not belong to the first resource pool as not belonging to the sidelink configured grant transmission resource.

For example, the terminal device first uses the above formula to determine the time domain positions of multiple first time units, among which m1 first time units are time units in the first resource pool, and m2 first time units are not time units in the first resource pool. In this case, the time domain positions of the m1 first time units which belong to the first resource pool may be determined as the time domain positions of the sidelink configured grant transmission resources of the terminal device. In addition, the time domain positions of the m2 first time units which do not belong to the first resource pool are discarded, or are determined as not belonging to the sidelink configured grant transmission resources.

Optionally, in some embodiments of the present disclosure, determining the time domain position of the sidelink configured grant transmission resource according to the first time unit and the first resource pool includes: in response to that the first time unit is not a time unit in the first resource pool, determining, by the terminal device, a time domain position of a second time unit according to the time domain position of the first time unit, and determining the time domain position of the second time unit as the time domain position of the sidelink configured grant (SL CG) transmission resource, wherein the time domain position of the second time unit belongs to the first resource pool.

For example, the terminal device first uses the above formula to determine the time domain positions of multiple first time units, among which m1 first time units are time units in the first resource pool, and m2 first time units are not time units in the first resource pool. In this case, the time domain positions of the m2 first time units that do not belong to the first resource pool may be adjusted to second time units that belong to the first resource pool. Then, the time domain positions of the m1 first time units which belong to the first resource pool and the time domain positions of the m2 second time units are determined as the time domain positions of the sidelink configured grant transmission resource for the terminal device.

Optionally, in some embodiments of the present disclosure, the time domain position of the second time unit is a time domain position of the first one of time units belonging to the first resource pool after the time domain position of the first time unit.

For example, the calculated time domain positions of the first time units include indices of three slots: 5, 11, and 16, where slot 16 does not belong to the first resource pool. The resource belonging to the first resource pool after the slot 16 is the slot 18, and the slot 16 is adjusted to the slot 18. Finally, the time domain positions of the SL CG transmission resources for the terminal device include slots 5, 11, and 18.

For another example, the calculated time domain positions of the first time units include indices of three subframes: 7, 14, and 20, where subframe 14 does not belong to the first resource pool. The resource belonging to the first resource pool after the subframe 14 is the subframe 15, and the subframe 14 is adjusted to the subframe 15. Finally, the time domain positions of the SL CG transmission resources for the terminal device include subframes 7, 15, and 20.

Optionally, in some embodiments of the present disclosure, time domain position of the second time unit is a time domain position of a time unit in the first resource pool with the smallest interval from the first time unit.

For example, the calculated time domain positions of the first time units include indices of three slots: 5, 11, and 16, where slot 16 does not belong to the first resource pool. The resource with the smallest interval from the slot 16 and belonging to the first resource pool is the slot 15, then the slot 16 is adjusted to the slot 15. Finally, the time domain positions of the SL CG transmission resources for the terminal device include slots 5, 11, and 15.

For another example, the calculated time domain positions of the first time units include indices of three subframes: 7, 14, and 20, where subframe 14 does not belong to the first resource pool. The resource with the smallest interval from the subframe 14 and belonging to the first resource pool is the subframe 15, then the subframe 14 is adjusted to the subframe 15. Finally, the time domain positions of the SL CG transmission resources for the terminal device include subframes 7, 15, and 20.

Optionally, in some embodiments of the present disclosure, if there are a plurality of time units with the smallest interval from the time domain position of the first time unit, a time unit among the plurality of time units, which is after the time domain position of the first time unit, belongs to the first resource pool and has the smallest interval from the first time unit, is determined as the time domain position of the second time unit. This can reduce the delay of data processing.

For example, the calculated time domain positions of the first time units include indices of three slots: 5, 11, and 16, where slot 16 does not belong to the first resource pool. The resources with the smallest interval from the slot 16 and belonging to the first resource pool are the slot 14 and the slot 18, and then the slot 16 is adjusted to the slot 18. Finally, the time domain positions of the SL CG transmission resources for the terminal device include slots 5, 11, and 18.

For another example, the calculated time domain positions of the first time units include indices of three subframes: 7, 14, and 20, where subframe 14 does not belong to the first resource pool. The resource with the smallest interval from the subframe 14 and belonging to the first resource pool is subframe 11 or subframe 17, and then subframe 14 is adjusted to subframe 17. Finally, the time domain positions of the SL CG transmission resources for the terminal device include subframes 7, 17, and 20.

In addition, if there are multiple time units with the smallest interval from the time domain position of the first time unit, a time unit among the time units, which is before the time domain position of the first time unit, belongs to the first resource pool and has the smallest interval from the first time unit, may be determined as the time domain position of the second time unit.

In an application scenario, in LTE-V2X, the time domain resources in the resource pool may be determined in the following exemplary manner:

For example, the resource pool may be determined within one SFN or DFN period. One SFN period includes 10240 subframes, corresponding to subframes 0, 1, 2, . . . , 10239, respectively (these subframes are also called physical slots or physical subframes). With a synchronization subframe, a downlink subframe, a special subframe (such as downlink subframe and special subframes in Time Division Duplexing (TDD) systems) and a reserved subframe removed from these subframes, the index of the remaining subframes are $$(t_0^{SL}, t_1^{SL}, \ldots, t_{T_{max}}^{SL}).$$

The remaining subframes are also called logical subframes. The number of remaining subframes is divisible by the length $L_{bitmap}$ of the bitmap. The bitmap $(b_0, b_1, \ldots, b_{L_{bitmap}})$ is periodically repeated in the remaining subframes to determine which subframes in the remaining subframes belong to the resource pool, and a bit of 1 indicates that the subframe corresponding to this bit in the remaining subframes belongs to the resource pool; otherwise, the subframe does not belong to the resource pool.

Figure 5:
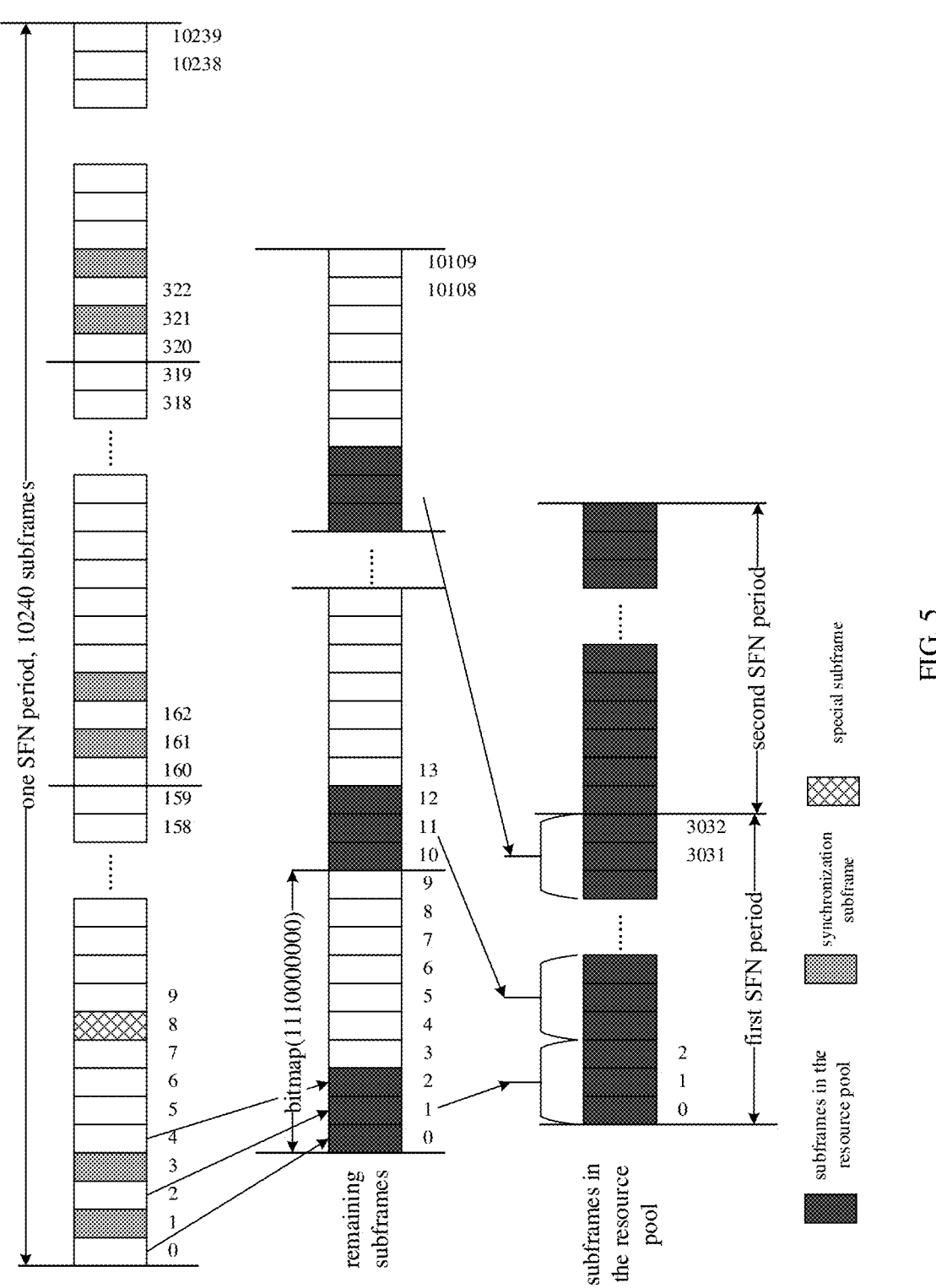
FIG. 5 is a schematic diagram of determining a resource pool.

As shown in FIG. 5, one SFN period (or DFN period) includes 10240 subframes (these subframes are called physical subframes or physical slots). The period of the synchronization signal is 160 ms. One synchronization period includes two synchronization subframes. There are a total of 128 synchronization subframes in one SFN period, the length of the bitmap used to indicate the time domain resources of the resource pool is 10 bits, and 2 reserved subframes are required. Therefore, the number of remaining subframes is (10240−128−2=10110), which can be divided by the length 10 of the bitmap. The indices of the remaining subframes are renumbered as 0, 1, 2, . . . , 10109 (these subframes are also called logical subframes or logical slots). If the first 3 bits of the bitmap are 1 and the remaining 7 bits are 0, that is, in the remaining subframes, the first 3 subframes in every 10 subframes belong to the resource pool, and the remaining subframes do not belong to the resource pool. Since the bitmap needs to be repeated 1011 times in the remaining subframes to indicate whether all the remaining subframes belong to the resource pool and each bitmap period includes 3 subframes, there are total of 3033 subframes in one SFN period belonging to the resource pool. In the above description, the time unit is a subframe in LTE-V2X as an example, and in some other examples, the time unit can also be a slot in NR-V2X, and the manner for determining the resource pool is similar and repeated descriptions will be omitted here.

In NR-V2X, mode 1 and mode 2 resource allocation methods are supported. In mode 2, a terminal autonomously selects transmission resources in a resource pool for sidelink transmission. In mode 1, the network allocates sidelink transmission resources to a terminal. Specifically, the network may allocate sidelink transmission resources to the terminal by means of Dynamic Scheduling (DG); or the network may allocate sidelink (SL) Configured Grant (CG) transmission resources to the terminal. For the CG resource allocation method, there are mainly two types of configured grant: type-1 configured grant and type-2 configured grant.

Type-1 configured grant: the network configures sidelink transmission resources for the terminal through RRC signaling. The RRC signaling may configure all transmission resources and transmission parameters including time domain resources, frequency domain resources, Demodulation Reference Signal (DMRS), Modulation and Coding Scheme (MCS), and the like. After the UE receives the higher layer parameters, the UE can immediately use the configured transmission parameters to perform sidelink transmission on the configured time-frequency resources.

Type-2 configured grant: a two-step resource configuration method is adopted, that is, an RRC+DCI method. First, RRC signaling configures transmission resources and transmission parameters including the period of time-frequency resources, redundancy version, number of retransmissions, and the number of Hybrid Automatic Repeat reQuest (HARQ) processes. Then, the Type-2 configured grant transmission is activated by the DCI, and other transmission resources and transmission parameters including time domain resources, frequency domain resources, MCS, and so on are configured at the same time. When the terminal receives the RRC signaling, it cannot immediately use the resources and parameters configured by the higher layer parameters for sidelink transmission, and need to wait for the corresponding DCI to activate the sidelink configured grant before performing sidelink transmission. In addition, the network can deactivate the sidelink configured grant through DCI, and after the terminal receives the deactivating DCI, the terminal can no longer use the sidelink configured grant transmission resource for sidelink transmission.

If the network allocates the configured grant transmission resources for the terminal, when the terminal has sidelink data to transmit, it can directly use the transmission resources for transmission, without need of transmitting a Scheduling Request (SR)/Buffer Status Report (BSR) to the network to request transmission resource, thereby reducing latency.

In NR-V2X, the sidelink configured grant resources configured by the network are associated with a resource pool, that is, the sidelink configured grant transmission resources are the transmission resources in the associated resource pool.

In the signaling for the network to configure the sidelink configured grant, the following parameters may be indicated:

slot offset: used to determine the time domain position of the first sidelink configured grant; and periodicity: the periodicity of the sidelink configured grant transmission resources.

For example, if the periodicity parameter of the sidelink configured grant is based on physical time (such as 10 ms, 100 ms, 500 ms, etc.), or based on the number of physical slots, the slot determined according to the slot offset and the periodicity may have at least the following situations:

the slot does not belong to any resource pool, such as sidelink synchronization signal block (Sidelink SSB, S-SSB) slot or the reserved slot;

the slot does not belong to the resource pool associated with the sidelink configured grant;

In these situations, the embodiments of the present disclosure need to determine the slot position where the sidelink configured grant transmission resource is located.

The network may configure the sidelink configured grant transmission resource.

For the type-1 sidelink configured grant, the network may configure the parameters for the sidelink configured grant to the terminal through the configuration information, such as time domain offset, periodicity, and time domain resource indication information, and so on. Then, the terminal may determine the time domain position of the sidelink configured grant resource by the following formula:

$$(\text{numberOfSlotsPerFrame} \times \text{SFN} + \text{slot number in the frame}) = [\text{timeDomainOffset} + \text{timeResourceIndication} + N \times \text{periodicity}] \text{modulo}(1024 \times \text{numberOfSlotsPerFrame}) \quad (3)$$

The meaning of each parameter in this formula is as follows:

timeDomainOffset: the time domain offset of the sidelink configured grant transmission resources, which is used to determine the time domain position of the first sidelink configured grant transmission resource, represented by the number of slots;

timeResourceIndication: the time domain resource indication determined according to the time domain resource indication information in the configuration information;

periodicity: the periodicity of the sidelink configured grant transmission resources, represented by the number of slots;

numberOfSlotsPerFrame: the number of slots included in a radio frame;

SFN: SFN index, the value range being [0,1023];

slot number in the frame: slot index in a radio frame;

$N \ge 0$;

according to the SFN and the slot number in the frame that make the above equation true, the slot corresponding to the sidelink configured grant transmission resource can be obtained, and specifically the index of the slot can be determined.

For type-2 sidelink configured grant, the network may configure parameters for sidelink configured grant, such as periodicity, to the terminal through configuration information. The network activates the sidelink configured grant through the DCI, and carries the time domain resource indication information in the DCI. The terminal determines the frame number index $\text{SFN}_{DCI}$ and the slot index $\text{Slot}_{DCI}$ according to the slot where the DCI is located, and determines the time domain resource indication according to the time domain resource indication information. The time domain position of the sidelink configured grant resource can be determined by the following formula:

$$(\text{numberOfSlotsPerFrame} \times \text{SFN} + \text{slot number in the frame}) = [\text{SFN}_{DCI} \times \text{numberOfSlotsPerFrame} + \text{Slot}_{DCI} + \text{timeResourceIndication} + N \times \text{periodicity}] \text{modulo}(1024 \times \text{numberOfSlotsPerFrame}) \quad (4)$$

The meaning of each parameter in this formula is as follows:

$\text{SFN}_{DCI}$: the frame number index determined according to the slot where the DCI for activating the sidelink configured grant transmission resource is located;

$\text{Slot}_{DCI}$: the slot index determined according to the slot where the DCI for activating the sidelink configured grant transmission resource is located; where the slot index is an index of the slot in a radio frame period;

timeResourceIndication: the time domain resource indication determined according to the time domain resource indication information in the DCI;

periodicity: the periodicity of the sidelink configured grant transmission resource, represented by the number of slots;

numberOfSlotsPerFrame: the number of slots included in a radio frame;

SFN: SFN index, the value range being [0,1023];

slot number in the frame: slot index in a radio frame;

$N \ge 0$;

according to the SFN and the slot number in the frame that make the above equation true, the slot corresponding to the sidelink configured grant transmission resource can be obtained, and specifically the index of the slot can be determined.

The above formulas are only given as examples for preliminarily determining the slot where the sidelink configured grant transmission resource is located according to the configuration parameters, and other formulas may also be used to preliminarily determine the slot where the sidelink configured grant transmission resource is located, which is not limited in the present disclosure.

If the slot determined according to the above formulas is a synchronization slot, a reserved slot, or a slot that does not belong to the resource pool associated with the sidelink configured grant, the time domain position of the sidelink configured grant transmission resource may be determined in the following example manners.

Figure 6:
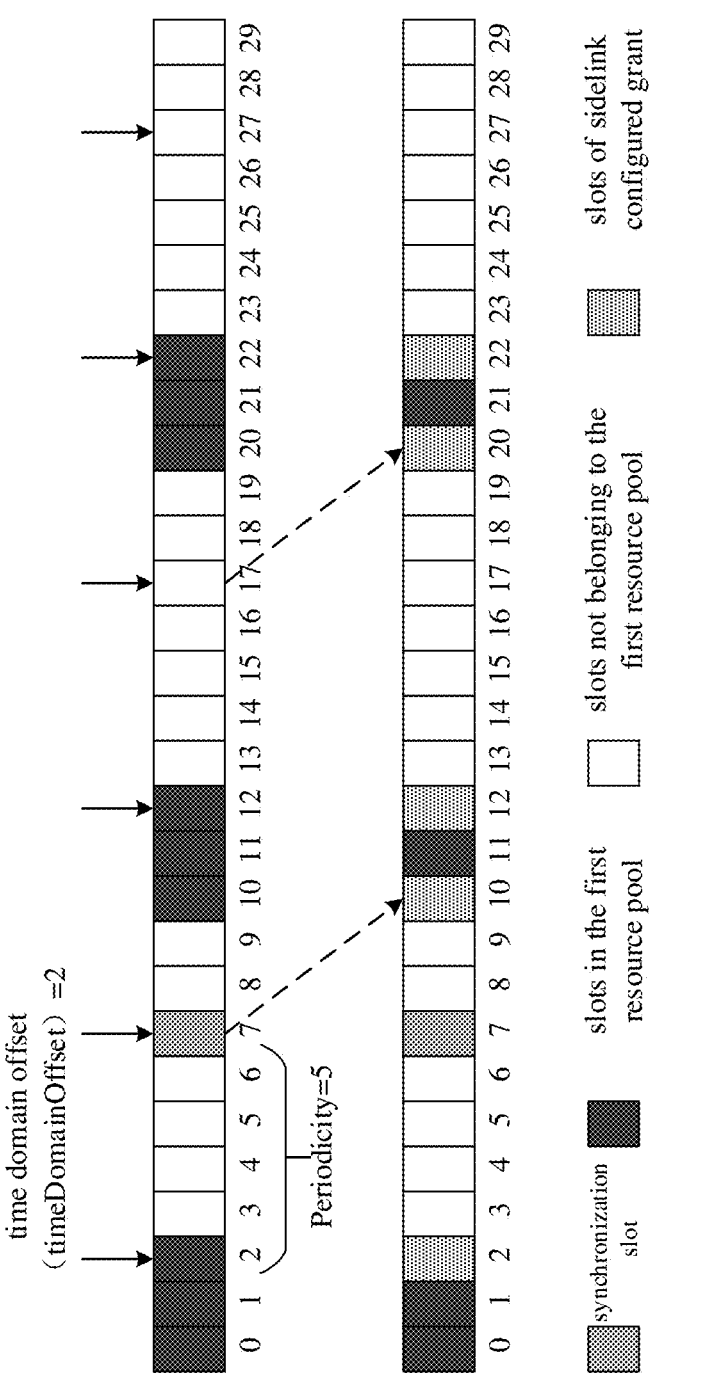
FIG. 6 is an example diagram of determining a slot where a sidelink configured grant transmission resource is located.

Example 1: the First Available Slot after the Slot is Used as the Slot of the Sidelink Configured Grant Transmission Resource As shown in FIG. 6, the numbers of the slot indices are numbered according to physical slots, and FIG. 6 schematically shows the first 30 slots in an SFN period (these slots may be physical slots). The slots corresponding to the black boxes in FIG. 6 are slots belonging to the first resource pool. The sidelink configured grant (SL CG) is associated with the first resource pool, that is, sidelink configured grant transmission resource is a resource belonging to the first resource pool. The grey boxes represent the slots used to transmit synchronization signals, i.e., S-SSB slots. The white boxes indicate resources that do not belong to the first resource pool, for example, including unavailable slots such as reserved slots, or slots of other resource pools except the first resource pool.

The parameters for sidelink configured grant are: time-DomainOffset=2, periodicity=5, and numberOfSlotsPer-Frame=10. Thus, the slot positions determined according to formula (3) or formula (4) are respectively slots: [2, 7, 12, 17, 22, 27], as shown in the first row of FIG. 6. Slot 2 represents a slot with an index of 2, and similar descriptions have similar meanings, which are not repeated here.

Slot 7 is a synchronization slot and does not belong to any resource pool, and thus it cannot be used as a sidelink configured grant transmission resource. The first available slot after the slot 7 is used as the sidelink configured grant transmission resource. The first available slot after the slot, that is, the first slot after the slot and belonging to the first resource pool is slot 10, and the slot 10 is used as the sidelink configured grant transmission resource.

Slot 17 is a resource that does not belong to the first resource pool, and thus it cannot be used as a sidelink configured grant transmission resource. The first available slot after this slot 17 which can be used as a sidelink configured grant transmission resource is slot 20. Slot 20 is used as a sidelink configured grant transmission resource.

The processing of slot 27 is like the processing of slot 17, and the first available slot after the slot 27, that is, the slot 30 (not shown in the figure), is used as the sidelink configured grant transmission resource.

Therefore, the slots where the sidelink configured grant transmission resources determined according to the above method are located are respectively [2, 10, 12, 20, 22], as shown in the dotted filled boxes in the second row of FIG. 6.

Figure 7:
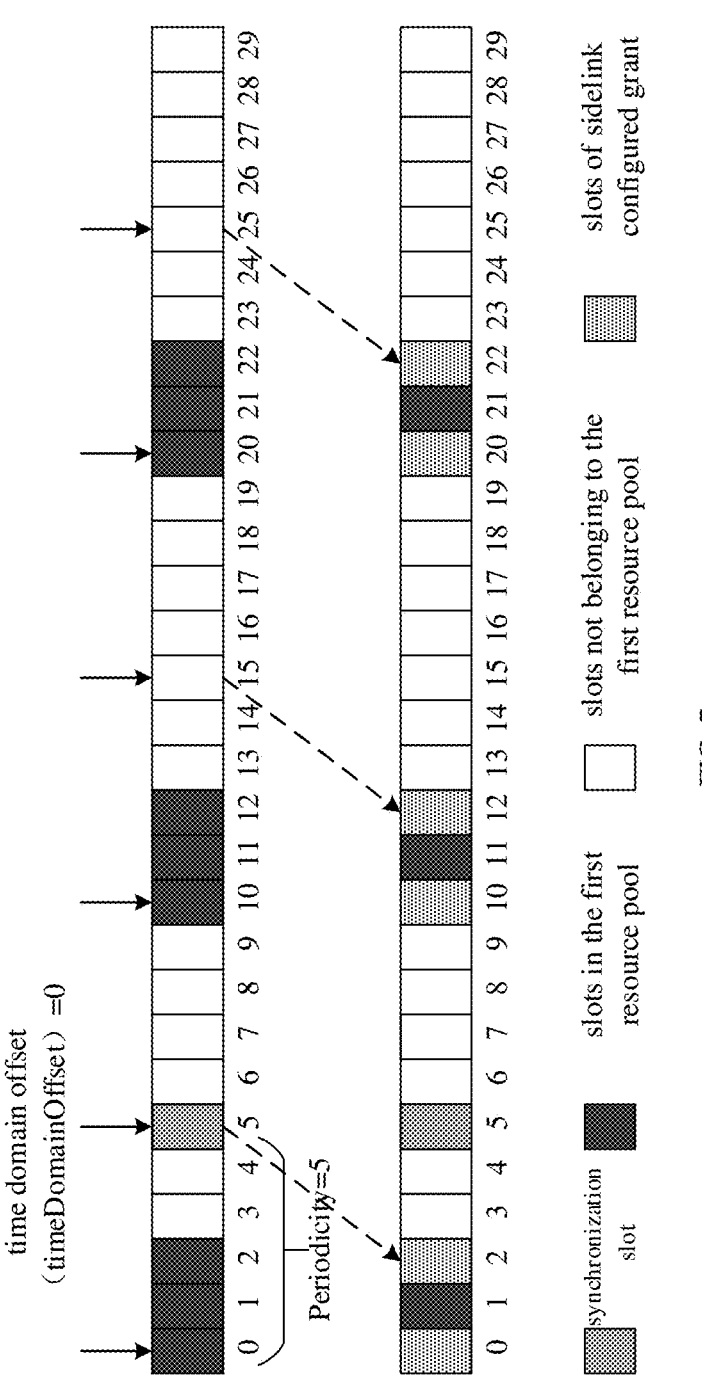
FIG. 7 is another example diagram of determining a slot where a sidelink configured grant transmission resource is located.

Example 2: an Available Slot with the Smallest Distance from the Slot is Used as the Slot of the Sidelink Configured Grant Transmission Resource As shown in FIG. 7, the index numbers of the slots are numbered according to physical slots, and FIG. 7 schematically shows the first 30 slots in an SFN period. The slots corresponding to the black boxes in FIG. 7 are slots belonging to the first resource pool. The sidelink configured grant is associated with the first resource pool, that is, the sidelink configured grant transmission resources are resources belonging to the first resource pool. The gray box represents the slot used to transmit the synchronization signal, that is, the S-SSB slot. The white boxes represent the resources that do not belong to the first resource pool, for example, including unavailable slots such as reserved slots, or slots of other resource pools except the first resource pool.

The parameters for sidelink configured grant are: time-DomainOffset=0, periodicity=5, and numberOfSlotsPer-Frame=10. Thus, the slot positions determined according to formula (3) or formula (4) are respectively slots: [0, 5, 10, 15, 20, 25], as shown in the first row of FIG. 7.

Slot 5 is a synchronization slot and does not belong to any resource pool, and thus it cannot be used as a sidelink configured grant transmission resource. The available slot with the smallest distance from the slot 5 is the slot 2, and the slot 2 is used as the sidelink configured grant transmission resource.

Slot 15 is a resource that does not belong to the first resource pool, and therefore cannot be used as a sidelink configured grant transmission resource. The available slot with the smallest distance from the slot 15 is the slot 12, and the slot 12 is used as the sidelink configured grant transmission resource.

Slot 25 is a resource that does not belong to the first resource pool, and therefore cannot be used as a sidelink configured grant transmission resource. The available slot with the smallest distance from the slot 25 is the slot 22, and the slot 22 is used as the sidelink configured grant transmission resource.

Therefore, the slots where the sidelink configured grant transmission resources determined according to the above method are located are respectively [0, 2, 10, 12, 20, 22], as shown in the second row of FIG. 7.

In some embodiments, if there are two available slots with the smallest distance from the slot, one of the two slots after the slot can be selected as the slot of sidelink configured grant. Assuming that in FIG. 7, the slot determined according to the parameters of the sidelink configured grant is slot 6, and the available slots with the smallest distance from this slot 6 include slot 2 and slot 10, and then slot 10 can be selected as the slot of the sidelink configured grant.

Example 3: if the Slot Determined According to the Above Formula does not Belong to the First Resource Pool, the Slot is Discarded, and Only the Slot(s) Belonging to the First Resource Pool is(are) Used as the Slot(s) of the Sidelink Configured Grant Transmission Resource(s)

Figure 8:
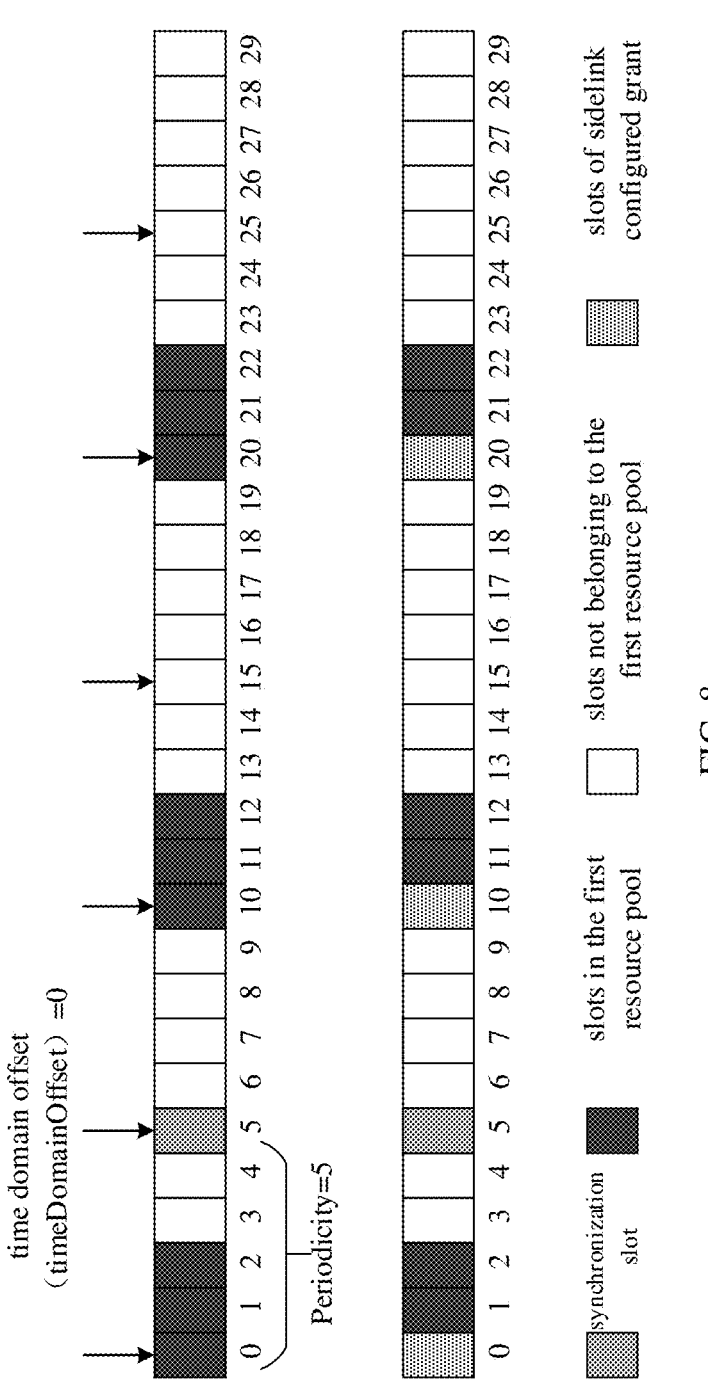
FIG. 8 is another example diagram of determining a slot where a sidelink configured grant transmission resource is located.

As shown in FIG. 8, the index numbers of the slots are numbered according to physical slots, and FIG. 8 schematically shows the first 30 slots in an SFN period. The slots corresponding to the black boxes in FIG. 8 are slots belonging to the first resource pool. The sidelink configured grant is associated with the first resource pool, that is, the sidelink configured grant resources are resources belonging to the first resource pool. The gray box represents the slot used to transmit the synchronization signal, that is, the S-SSB slot. The white boxes represent the resources that do not belong to the first resource pool, for example, including unavailable slots such as reserved slots, or slots of other resource pools except the first resource pool.

The parameters for sidelink configured grant are: time-DomainOffset=0, periodicity=5, and numberOfSlotsPer-Frame=10. Thus, the slot positions determined according to formula (3) or formula (4) are respectively slots: [0, 5, 10, 15, 20, 25], as shown in the first row of FIG. 8.

Slot 5 is a synchronization slot, does not belong to any resource pool, and cannot be used as a sidelink configured grant transmission resource. Therefore, slot 5 is discarded.

Slot 15 is a resource that does not belong to the first resource pool, and cannot be used as a sidelink configured grant transmission resource. Therefore, slot 15 is discarded.

Slot 25 is a resource that does not belong to the first resource pool, and cannot be used as a sidelink configured grant transmission resource. Therefore, slot 25 is discarded.

Therefore, the slots where the sidelink configured grant transmission resources determined according to the above method are located are respectively [0, 10, 20], as shown in the second row of FIG. 8.

The embodiments of the present disclosure provide methods for determining time units (such as slots) where the sidelink configured grant transmission resources are located. The methods are applicable in the case where the configuration parameters for the sidelink configured grant are based on the number of physical slots, and can solve the problem of how to determine the sidelink configured grant transmission resources when the slot positions calculated according to the formulas do not belong to the resource pool associated with the sidelink configured grant.

Figure 9:
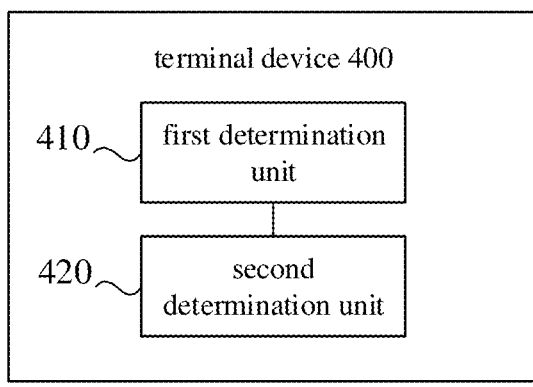
FIG. 9 is a schematic block diagram of a terminal device according to an embodiment of the present disclosure.

FIG. 9 is a schematic block diagram of a terminal device 400 according to an embodiment of the present disclosure. The terminal device 400 may include a first determination unit 410 and a second determination unit 420.

The first determination unit 410 is configured to determine a time domain position of a first time unit.

The second determination unit 420 is configured to determine a time domain position of a sidelink configured grant transmission resource according to the first time unit and a first resource pool, wherein the first resource pool is a resource pool associated with the sidelink configured grant.

Optionally, in some embodiments of the present disclosure, the second determination unit 420 is configured to:

determine the time domain position of the first time unit that belongs to the first resource pool as the time domain position of the sidelink configured grant transmission resource.

Optionally, in some embodiments of the present disclosure, the second determination unit 420 is configured to:

in response to that the first time unit is not a time unit in the first resource pool, determine a time domain position of a second time unit according to the time domain position of the first time unit, and determine the time domain position of the second time unit as the time domain position of the sidelink configured grant (SL CG) transmission resource, wherein the time domain position of the second time unit belongs to the first resource pool.

Optionally, in some embodiments of the present disclosure, the time domain position of the second time unit is a time domain position of the first one of time units belonging to the first resource pool after the time domain position of the first time unit.

Optionally, in some embodiments of the present disclosure, the time domain position of the second time unit is a time domain position of a time unit in the first resource pool with the smallest interval from the first time unit.

Optionally, in some embodiments of the present disclosure, the second determination unit 420 is further configured to: in response to that there are a plurality of time units with the smallest interval from the time domain position of the first time unit, determine a time unit among the plurality of time units, which is after the time domain position of the first time unit, belongs to the first resource pool and has the smallest interval from the first time unit, as the time domain position of the second time unit.

Optionally, in some embodiments of the present disclosure, the time domain position of the first time unit is determined using a first formula.

Optionally, in some embodiments of the present disclosure, the first formula includes at least one of the following parameters: a time domain offset, a periodicity, a time domain resource indication, a first frame number index, a first time unit index and the number of time units in a radio frame;

wherein the time domain resource indication is determined according to time domain resource indication information, and the first frame number index and the first time unit index are determined according to a time domain position where DCI for activating the sidelink configured grant is located.

Optionally, in some embodiments of the present disclosure, the time domain position includes an index of a time unit.

Optionally, in some embodiments of the present disclosure, the time unit is a slot, and an index of the slot is equal to an index of SFN multiplied by the number of slots in a radio frame, then plus a slot number of the slot in the radio frame.

Optionally, in some embodiments of the present disclosure, the time unit is a subframe, and an index of the subframe is equal to an index of SFN multiplied by the number of subframes in a radio frame, then plus a subframe number of the subframe in the radio frame.

Figure 10:
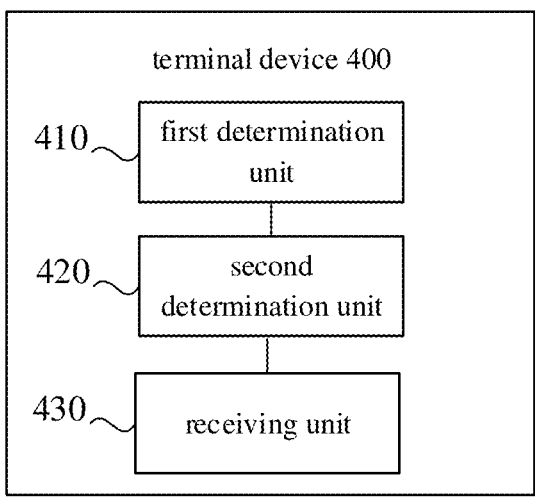
FIG. 10 is a schematic block diagram of a terminal device according to another embodiment of the present disclosure.

Optionally, in some embodiments of the present disclosure, as shown in FIG. 10, the terminal device further includes:

a receiving unit 430 configured to receive configuration information from a network device, wherein the configuration information is used by the terminal device to determine at least one of the following parameters: a slot offset, a periodicity, and the time domain resource indication.

The terminal device 400 according to embodiments of the present disclosure is capable of realizing the corresponding functions of the terminal device in the aforementioned method embodiments. The corresponding processes, functions, implementations and beneficial effects of each module (sub-module, unit or component, and so on) in the terminal device 400 can be found in the corresponding descriptions in the aforementioned method embodiments, and repeated descriptions will be omitted here.

It is to be noted that the functions described with respect to the individual modules (sub-modules, units or components, and so on) in the terminal device 400 according to embodiments of the present disclosure may be implemented by different modules (sub-modules, units or components, and so on) or by the same module (sub-module, unit or component, and so on).

Figure 11:
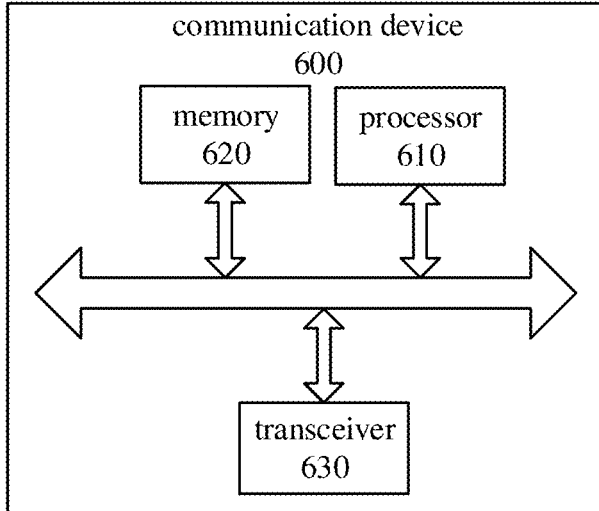
FIG. 11 is a schematic block diagram of a communication device according to an embodiment of the present disclo- sure.

FIG. 11 is a schematic structural diagram of a communication device 600 according to an embodiment of the present disclosure. The communication device 600 includes a processor 610, and the processor 610 may call and run a computer program from a memory to perform the method in embodiments of the present disclosure.

According to embodiments, as shown in FIG. 11, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 11, the communication device 600 may further include a transceiver 630, and the processor 610 may control the transceiver 630 to communicate with other devices. Specifically, the transceiver may transmit information or data to other devices, or receive information or data sent by other devices.

The transceiver 630 may include a transmitter and a receiver. The transceiver 630 may further include one or more antennas.

According to embodiments, the communication device 600 may specifically be the terminal device according to an embodiment of the present disclosure, and the communication device 600 may implement the corresponding processes implemented by the terminal in the method embodiments of the present disclosure.

Figure 12:
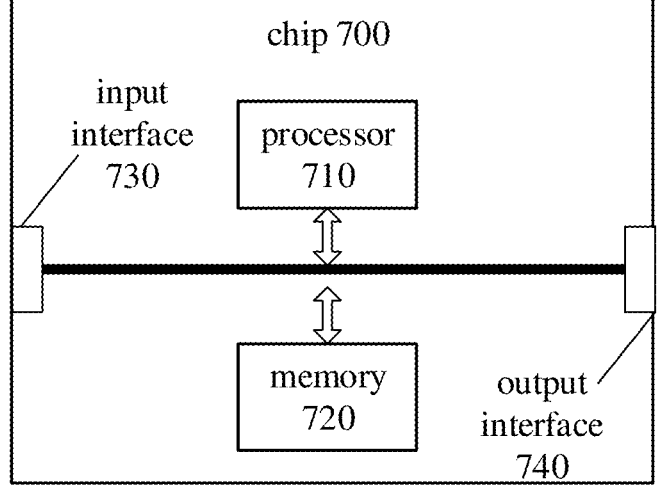
FIG. 12 is a schematic block diagram of a chip according to an embodiment of the present disclosure.

FIG. 12 is a schematic structural diagram of a chip 700 according to an embodiment of the present disclosure. The chip 700 includes a processor 710, and the processor 710 can call and run a computer program from a memory to implement the method according to embodiments of the present disclosure.

According to embodiments, as shown in FIG. 12, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the apparatus can be applied to the terminal device in embodiments of the present disclosure, and the apparatus can implement the corresponding processes implemented by the terminal device in various methods according to embodiments of the present disclosure. For brevity, details are not repeated herein again.

It should be understood that chip according to embodiments of the present disclosure may be called as a system-level chip, a system chip, a chip system, or a system-on-chip, etc.

The processor described above may be a general-purpose processor, a Digital Signal Processor (DSP), a Field Programmable Gate Array (FPGA), an Application Specific Integrated Circuit (ASIC), or other programmable logic device, transistor logic device, discrete hardware component. The general-purpose processor may be a microprocessor or the processor may also be any conventional processor or the like.

The memory described above may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM).

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

Figure 13:
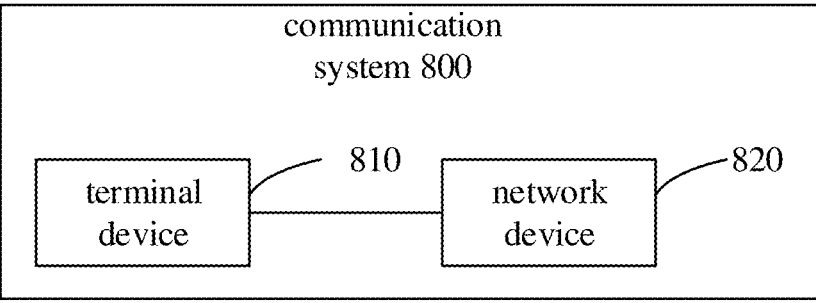
FIG. 13 is a schematic block diagram of a communication system according to an embodiment of the present disclo- sure.

FIG. 13 is a schematic block diagram of a communication system 800 according to an embodiment of the present disclosure. The communication system 800 includes a terminal device 810 and a network device 820.

The terminal device 810 is configured to: determine a time domain position of a first time unit; and determine a time domain position of a sidelink configured grant transmission resource according to the first time unit and a first resource pool, wherein the first resource pool is a resource pool associated with the sidelink configured grant.

According to some embodiments, the network device 820 is configured to transmit configuration information to the terminal device. The configuration information is used by the terminal device to determine at least one of the following parameters: a slot offset, a periodicity, and the time domain resource indication.

The terminal device 810 may be used for implementing corresponding functions of the terminal device in the above method embodiments, and the network device 820 may be used for implementing corresponding functions of the network device in the above method embodiments. For brevity, repeated descriptions are omitted here.

The above-mentioned embodiments may be implemented in whole or in part by software, hardware, firmware or any combination thereof. When implemented in software, the embodiments can be implemented in whole or in part in the form of a computer program product. The computer program product includes one or more computer instructions. When the computer program instructions are loaded and executed on a computer, all or part of the processes or functions described in the embodiments of the present disclosure are produced. The computer may be a general purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website, computer, server, or data center to another website, computer, server, or data center in a wired manner (e.g., via coaxial cable, optical fiber, Digital Subscriber Line (DSL)) or in a wireless manner (e.g., via infrared, wireless, micro-wave, etc.). The computer-readable storage medium may be any available medium that can be accessed by a computer or a data storage device such as a server, data center, etc. that includes an integration of one or more available medium. The available medium may be magnetic medium (e.g., floppy disks, hard disks, magnetic tapes), optical medium (e.g., Digital Video Disc (DVD)), or semiconductor medium (e.g., Solid State Disk (SSD)), and so on.

It should be understood that in various embodiments of the present application, the serial number of each of the above processes does not imply the order of execution, and the order of execution of each process should be determined by its function and intrinsic logic, and the serial numbers should not constitute any limitation to the processes implemented in the embodiments of the present disclosure.

It may be clearly understood by those skilled in the art that details of specific operation procedures of the systems, devices and units can be found in the previous description regarding the method embodiments. Repeated descriptions are omitted here for ease and simplicity of description.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A transmission resource determination method, comprising:

determining, by a terminal device, a time domain position of a slot; and determining, by the terminal device, a time domain position of a sidelink configured grant transmission resource according to the time domain position of the slot determined by the terminal device and a first resource pool, wherein the first resource pool is a resource pool associated with the sidelink configured grant;

wherein determining, by the terminal device, the time domain position of the sidelink configured grant transmission resource according to the time domain position of the slot determined by the terminal device and the first resource pool comprises:

in response to the slot determined by the terminal device being not a slot in the first resource pool, determining, by the terminal device, a time domain position of another slot according to the time domain position of the slot determined by the terminal device, and determining the time domain position of the another slot as the time domain position of the sidelink configured grant transmission resource, wherein the time domain position of the another slot belongs to the first resource pool;

wherein the time domain position of the another slot is a time domain position of a first slot preceding all other slots in time, order, or importance and belonging to the first resource pool, after the time domain position of the slot determined by the terminal device.

2. The method according to claim 1, wherein determining, by the terminal device, the time domain position of the sidelink configured grant transmission resource according to the time domain position of the slot determined by the terminal device and the first resource pool comprises:

determining, by the terminal device, the time domain position of the slot determined by the terminal device that belongs to the first resource pool as the time domain position of the sidelink configured grant transmission resource.

3. The method according to claim 1, wherein the time domain position of the slot is determined using a first formula.

4. The method according to claim 3, wherein the first formula comprises at least one of the following parameters: a time domain offset, or a periodicity.

5. The method according to claim 1, wherein the time domain position of the slot comprises an index of the slot.

6. The method according to claim 4, further comprising:

receiving, by the terminal device, configuration information from a network device, wherein the configuration information is used by the terminal device to determine at least one of the following parameters: a slot offset, or a periodicity.

7. The method according to claim 4, wherein the time domain offset is used to determine a time domain position of the first sidelink configured grant transmission resource, and the periodicity is a periodicity of the sidelink configured grant transmission resource.

8. The method according to claim 7, wherein the time domain offset is the number of slots relative to System Frame Number (SFN)=0 or Direct Frame Number (DFN)=0, or the periodicity is represented by the number of slots.

9. A terminal device, comprising one or more processors, and memory storing a plurality of programs that, when executed by the one or more processors, cause the terminal device to:

determine a time domain position of a slot; and determine a time domain position of a sidelink configured grant transmission resource according to the time domain position of the slot determined by the terminal device and a first resource pool, wherein the first resource pool is a resource pool associated with the sidelink configured grant;

wherein when the plurality of programs are executed by the one or more processors, the terminal device is caused to:

in response to the slot determined by the terminal being not a slot in the first resource pool, determine a time domain position of another slot according to the time domain position of the slot determined by the terminal device, and determine the time domain position of the another slot as the time domain position of the sidelink configured grant transmission resource, wherein the time domain position of the another slot belongs to the first resource pool;

wherein the time domain position of the another slot is a time domain position of a first slot preceding all other slots in time, order or importance and belonging to the first resource pool, after the time domain position of the slot determined by the terminal device.

10. The terminal device according to claim 9, wherein when the plurality of programs are executed by the one or more processors, the terminal device is caused to:

determine the time domain position of the slot determined by the terminal device that belongs to the first resource pool as the time domain position of the sidelink configured grant transmission resource.

11. The terminal device according to claim 9, wherein the time domain position of the slot is determined using a first formula.

12. The terminal device according to claim 11, wherein the first formula comprises at least one of the following parameters: a time domain offset, or a periodicity.

13. The terminal device according to claim 9, wherein the time domain position of the slot comprises an index of the slot.

14. The terminal device according to claim 12, wherein when the plurality of programs are executed by the one or more processors, the terminal device is caused to:

receive configuration information from a network device, wherein the configuration information is used by the terminal device to determine at least one of the following parameters: a slot offset, or a periodicity.

15. The terminal device according to claim 12, wherein the time domain offset is used to determine a time domain position of the first sidelink configured grant transmission resource, and the periodicity is a periodicity of the sidelink configured grant transmission resource.

16. The terminal device according to claim 15, wherein the time domain offset is the number of slots relative to System Frame Number (SFN)=0 or Direct Frame Number (DFN)=0, or the periodicity is represented by the number of slots.

* * * * *